United States Patent [19]
Welker

[11] Patent Number: 6,120,035
[45] Date of Patent: Sep. 19, 2000

[54] MATING RING SEAL MEMBERS WITH BEVELED MITERED INTERFACE

[75] Inventor: Brian H. Welker, Sugar Land, Tex.

[73] Assignee: Welker Engineering Company, Sugar Land, Tex.

[21] Appl. No.: 09/140,056

[22] Filed: Aug. 26, 1998

[51] Int. Cl.⁷ .................................................... F16J 9/14
[52] U.S. Cl. ......................... 277/499; 277/626; 277/644
[58] Field of Search ................................. 277/499, 626, 277/644

[56] References Cited

U.S. PATENT DOCUMENTS

| | | | |
|---|---|---|---|
| 1,357,729 | 11/1920 | Schaap | 277/499 X |
| 1,560,818 | 11/1925 | Houldsworth | 277/499 X |
| 2,299,395 | 10/1942 | Karlberg | 277/910 X |
| 2,462,586 | 2/1949 | Whittingham | 277/499 X |
| 2,962,332 | 11/1960 | Hale | 277/499 |
| 3,071,386 | 1/1963 | Scannell | 277/910 X |
| 3,712,631 | 1/1973 | Forchini et al. | 277/207 |
| 4,418,581 | 12/1983 | Jones | 73/864.34 |
| 5,186,473 | 2/1993 | Windges et al. | 277/DIG. 7 X |
| 5,207,523 | 5/1993 | Witter | 401/107 |
| 5,921,755 | 7/1999 | Eldridge | 417/255 |

FOREIGN PATENT DOCUMENTS 538637  4/1993  European Pat. Off. .

OTHER PUBLICATIONS

Derwent Abstract of SU 1737192 Published May 1992 by Shuiskii Design of Solid Piston Ring Employes Partial Redial annd Axial Slits to Provide Self–Expansion on Wear in Conjunction with Expander Ring in Piston Groove.

*Primary Examiner*—Thomas P. Noland
*Attorney, Agent, or Firm*—Herzog, Crebs & McGhee, LLP; Mark E. Stallion

[57] ABSTRACT

An end cap with a inwardly flanged bevel tapered seal utilized on sample cylinders for pipeline applications that provides a better means for sealing the sample cylinder. The present invention specifically relates to mating ring seal members having a beveled mitered interface and each member having an inward flange or lip. The preferred embodiment of the invention was designed with a sample cylinder in mind wherein the sample cylinder has an end cap with a purging port and a piston that reciprocates within said sample cylinder. The typical sample cylinder is designed such that contents in the internal sampling chamber can be purged through the purging port of the end cap by plunging the piston inside the sampling chamber against the end cap in a reciprocating fashion. When purging occurs, sometimes a residual of the contents remains behind, particularly around the seal of the end cap and the seal of the piston between the piston and the internal side wall of the sampling chamber and between the end cap and the side wall. The inwardly flanged beveled seal members are designed to eliminate space or gaps where residue may be trapped.

4 Claims, 2 Drawing Sheets

MATING RING SEAL MEMBERS WITH BEVELED MITERED INTERFACE

BACKGROUND OF THE INVENTION

1. Field of the Invention

This invention relates to the field of pipeline fluid or pipeline gas handling systems, and particularly pipeline sample cylinder end caps.

2. Related Art

The following term(s) as used herein have the following meanings: "straight" means without sharp bends or sudden changes in direction, so even a slight angle or curve is straight for the purpose of this application, the essence of "straight" merely being to minimize blockage in ducts.

Sample cylinders are utilized in pipeline system applications. Sample cylinders automatically sample a product being routed through a pipeline. End caps on the sample cylinders have internal purging and inlet ducts whereby the product enters for sampling and exits after sampling during purging. Several samples may be taken over a given period of time. After each sample is taken the sample cylinder is purged. It is essential that a given sample is purged completely so that residue from a given sample does not cross contaminate subsequent samples. If dead space exists in the end cap or in the sampling chamber of the sample cylinder or at the interface between the end cap and cylinder where residual material can get trapped and the dead space is in an area that is difficult to purge, then this is a problem that requires resolving. Also, residual material can get trapped in the inlet or purging ports because of contours or bends in the port that disrupt a direct and straight flow path of fluid. Such areas where residual material can be trapped are sometimes difficult to purge.

Current end cap designs for sample cylinders have a generally cylindrical flanged plug structure. The flanged plug design acts as a closure member for the sample cylinder. The plug portion of the closure member axially inserts into the end opening of the sample cylinder thereby plugging the sample cylinder. Also, current end cap and sample cylinder designs tend to have an o-ring seal that is installed circumferencially around the end cap plug end and around the generally cylindrical piston that is axially displaced within the sample cylinder. O-ring seals are usually installed in a radially recessed groove. With this design dead-space may exist around the o-ring seal.

This problem with end cap and sample cylinder designs have not been effectively addressed by any known prior art patents.

The are some prior art patents that address the use of sample cylinders and the various end cap designs and there are some patents that address seal designs. None are designed to eliminate the problem of dead space around o-ring seals used on end caps and pistons of sample cylinders which causes residual material to be trapped.

U.S. Pat. No. 3,712,631 issued Jan. 23, 1973 to Forchina shows a sealing gasket for the joint between spigot pipes. The invention relates to a sealing means for pipe joints where a joint is formed by coaxially inserting one pipe into an adjoining pipe. This joint is similar to the joint formed when an end cap is coaxially press fit into the end of a sample cylinder, or to the seal formed when the piston is axially displaced within the sample cylinder. However when the patent is examined it is obvious that the dead space will still exist around the seal if this seal is utilized. The preferred embodiment shows a seal having a triangular cross section. This geometry will not eliminate the problem.

U.S. Pat. No. 4,628,750 issued Dec. 16, 1986, to Welker shows an integrated pump and sample vessel. This invention uses the same flanged plug end cap design and sample cylinder piston described above, thereby having the problems described above. Residual material may get trapped around the o-ring seal.

U.S. Pat. No. 3,071,386 issued Jan. 1, 1963, to Scannell shows annular multi-element wedge shaped seals. The invention is particularly concerned with providing a seal for sealing a clearance between two relatively movable cylindrical parts arranged in an assembly wherein one part moves axially with respect to the other part. However, the purpose of this invention is to seal the clearance between to cylindrical surfaces, whereas the subject problem is not related to sealing clearances between two laterally disposed cylindrical surfaces. It is related to closing up recessed gaps or hidden crevices denoted as "dead space" between the component being sealed and the seal itself.

A practical solution for a sample cylinder end cap design that will eliminate the problem with residual material being left behind is needed.

SUMMARY OF INVENTION

It is in view of the above problems that the present invention was developed. The Applicant has taken a different approach than the above-cited patents. Applicant has recognized the real need to provide a simple, reliable end cap and piston seal for sample cylinder pipeline applications. The applicant has also recognized the non-obvious inherent problems when utilizing the conventional methods described above.

It is an object of the invention to economically provide an end cap and piston seal design that eliminates dead space that may cause residual material to be trapped.

It is also an object of this invention to maintain an adequate sealing means.

These above objects are achieved by utilizing a Zero Dead Space Seal For A Sample Cylinder for sample cylinder end caps and pistons. The end cap is a generally cylindrical flanged plug. The end cap is press fit into the cylindrical opening of the sample cylinder. The piston is a cylindrically shaped body that is displaced axially within the sample cylinder. The standard o-ring seal that is installed circumferentially around the plug of the end cap or around the piston is installed in a radially recessed groove. With this method dead space exists around the o-ring seal. The seal and the recessed groove that receives the seal is modified to create a zero dead space seal.

The present invention is a Zero Dead Space Sample Cylinder Piston/End-Cap Interface for sample cylinder units. The new interface utilizes a special bevel tapered seal in lieu of a standard o-ring seal in order to eliminate dead space around the o-ring seal for the end cap and the piston where there is a problem with residuals of the sample material being trapped in the dead space. Trapped material that remains after a sample and purge has occurred, results in cross contamination between samples when subsequent samples are taken. With the present invention. The end cap and piston both have a cylindrical seal with an inward flange on one end and a beveled tapered edge on the other end. The inward flange of the cylindrical seal fits in an oversized radially recessed groove formed by an inwardly stepped outer diameter. The flange is offset to one side of the groove and fits flush against one side wall of the groove. The offset of the flange within the groove leaves a dead space between the flange and the opposing side wall. This space is filled by an elastomeric ring which inhibits axial movement of the seal flange within the groove and assists in holding the seal flange in groove. The beveled angles are reversed for the end cap seal and the piston seal and the bevel tapered portion of seals extend axially beyond the mating flat end surfaces of the piston and end cap such that the seals mate up when the piston is pressed against the end cap thereby leaving no dead space. The bevels have a slightly different pitch such that radial compression of the seal occurs and a tight seal is formed. The new seal design utilizes a tapered seal on both the end cap and the piston.

In summary, there is a problem with residuals of the sample material being trapped in the dead space around the o-ring seals of the end cap and piston. Trapped residual material that remains after a sample and purge cycle has occurred, results in cross contamination between samples when subsequent samples are taken. With the present invention, the bevel tapered and inwardly flanged seal eliminates the dead space problem.

The invention thus provides an economical, safe, and low maintenance solution to solving the need for an end cap and piston design that purges without having left over residue.

DESCRIPTION OF THE PREFERRED EMBODIMENTS

Figure 1:
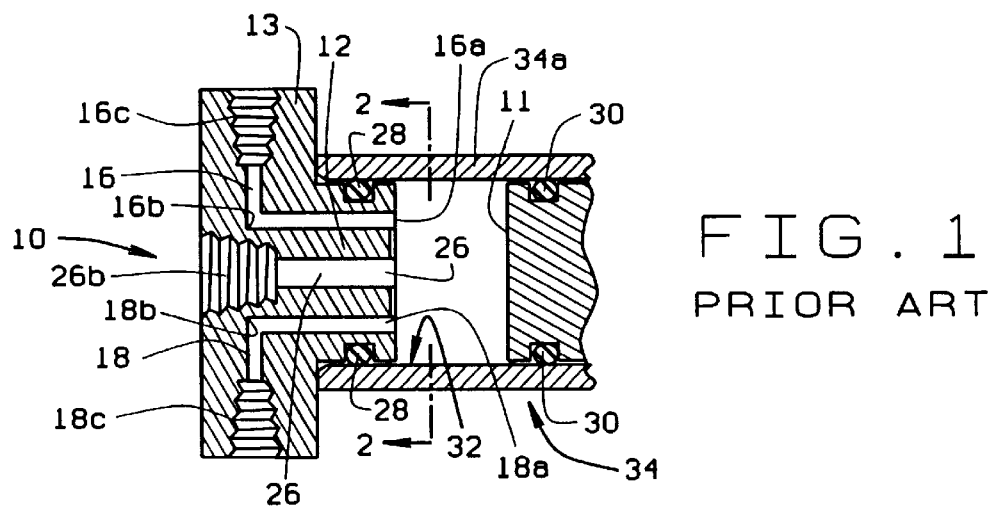
FIG. 1, an overall assembly diagram showing a cross section of the prior art sample cylinder end-cap.
Figure 2:
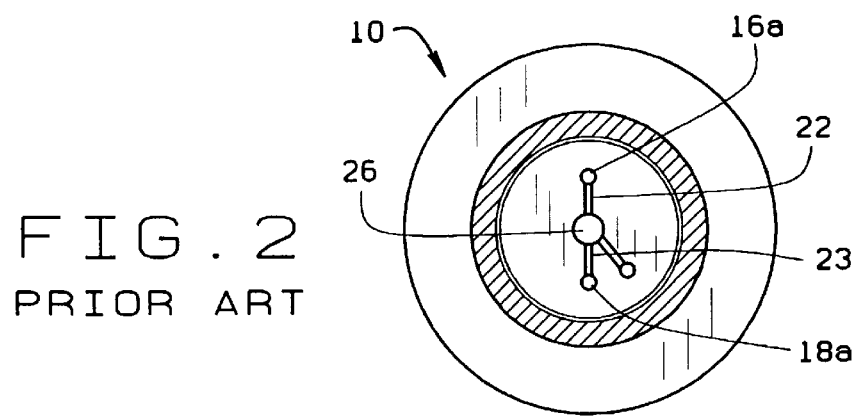
FIG. 2, a cross-sectional top view showing a cross section of the prior art end-cap. View 2—2.
Figure 3:
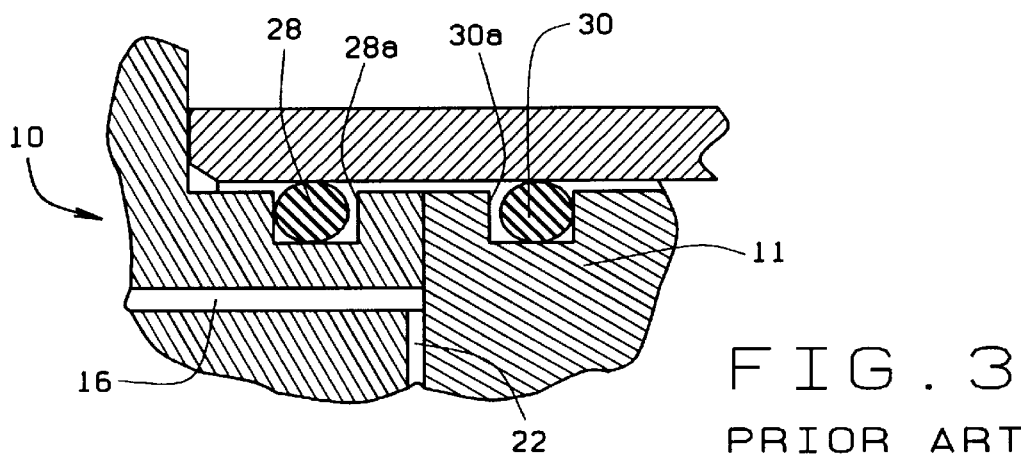
FIG. 3, a detail showing a cross section of the prior art end-cap seal interface.

For comparison purposes, FIGS. 1, 2, and 3 depict the prior art end cap described herein. The invention is first described with reference to FIG. 4 which depicts an overall cross-section of the end cap and sample cylinder interface. The detailed structure and function of the end cap is then described with reference to FIGS. 5 and 6.

Referring to FIG. 1, an overall assembly diagram shows a cross section of the prior art end cap 10 which is press fit into the end of a sample cylinder 34. End cap 10 with a flanged plug shape is shown with the plug end 12 of end cap 10 co-axially inserted into the cylindrical opening 32 of the sample cylinder 34 and sealed with an o-ring 28 that is installed circumferentially in a radially recessed groove in the plug end 12 of the end cap 10. Internal to the sample cylinder is a piston 11 that travels axially therein and said piston 11 has an o-ring seal 30 that is installed circumferentially in a radially recessed groove thereby sealing and isolating two distinct volumes/chambers that vary in size within the sample cylinder based on piston movement. One volume is the sampling chamber 36.

The end cap and the piston define the sampling chamber 36 there between. End cap 10 has ports 16a, 26a, and 18a on the plug end that open into the sampling chamber 36. Ports 16a, 26a and 18a are in volumetric and fluid communication with the sampling chamber 36.

Ducts 16, 26, and 18 extend from ducts 16a, 26a and 18a respectively. The ducts are cylindrical channels. The ducts extend parallel to one another and to the sample cylinder walls, until duct 16 and 18 make ninety degree bends. Duct 26 extends along the cylindrical axis of the end cap 10. The cylindrical axis of Duct 26 corresponds to the cylindrical axis of end cap 10 and sample cylinder 34, and Duct 26 extends axially from one end of the end cap to the opposing end. On the opposing end, port 26b opens to the outside. Port 26b is the purging port. Purging occurs by plunging the piston 11 against the end cap 10 thereby forcing fluid through Port 26a and on through Port 26b.

Ducts 16 and 18 extend in parallel to duct 26 on radially opposing sides of duct 26. Ducts 16 and 18 extend in parallel until they extend beyond the sample cylinder wall 34a. Once the duct has cleared the wall 34a and has a direct radial path to the outside within the end cap flange head 13, the ducts make opposing right angular bends 16b and 18b and extend to the respective exit ports 16c and 18c on the cylindrical sidewall of the cylindrical flange head 13.

Duct 18 serves as an inlet for the product sample and duct 16 serves as an inlet for the purging agent or vice versa.

View 2—2 of FIG. 1 is shown in FIG. 2.

Referring to FIG. 2 Ports 16a, 26a, and 18a are shown. A shallow chiseled groove 22 between ports 16a and 18a is shown.

Referring to FIG. 3 a detail of the interface between piston 11 and end cap 10 is shown. The circumferential o-rings 28 and 30 are shown and the radially recessed groove 28a and 30a wherein they are installed. Also, slot 22 is shown and duct 16 is shown.

Figure 4:
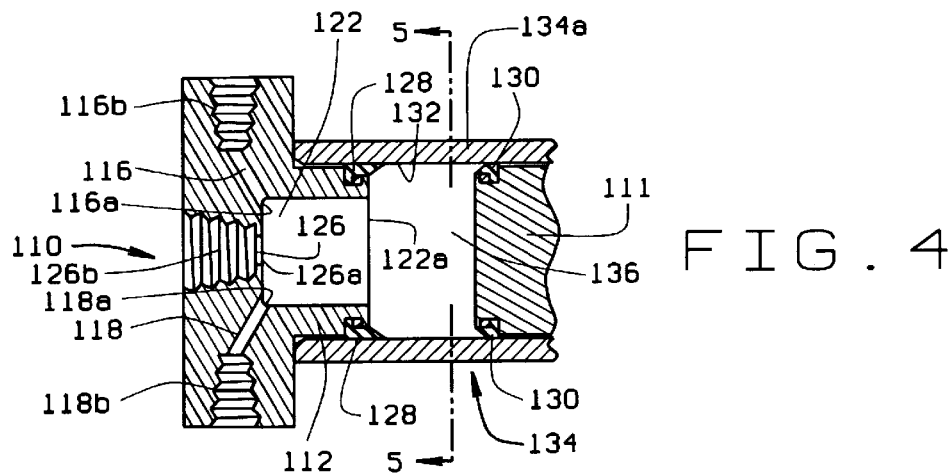
FIG. 4, an overall assembly diagram showing a cross section of the sample cylinder end-cap.

Referring to FIG. 4, an overall assembly diagram shows a cross section of the subject end cap 110 design which is press fit into the end of the sample cylinder 134 whereby the plug portion 112 of end cap 110 is axially inserted into the cylindrical opening 132. End cap 110 is press fit into the cylindrical opening 132 of the sample cylinder 134 and sealed with a seal 128 that is circumferentially installed in a radially recessed groove 128a in the plug end 112 of the end cap 110. Internal to the sample cylinder 134 is a piston 111 that travels axially therein and said piston has a seal 130 circumferentially installed in a radially recessed groove 130a thereby effectively sealing and isolating two distinct volumes/chambers within the sample cylinder that vary in size dependent on the position of the piston. One volume is the sampling chamber 136.

The end cap, cylinder and piston define this sampling chamber 136.

End cap 110 has a chiseled deep slotted groove 122 in the plug end 112 of end cap 110, that extends from the sample cylinder end of plug end 112 which is opening 122a. The depth of the slot extends in an axial direction from opening 122a and away from the sampling chamber 136. The depth of the slot is sufficient to extend further than the sample cylinder opening 132 where the end cap 110 is inserted. This is necessary to avoid the sample cylinder wall 134a. The design allows ducts 118 and 116 to have direct paths to ports 118b and 116b respectively without having to steer around the cylinder wall 134a.

This design also provides a semi contained common purging channel slot 122 for the inlet and purging ducts.

Ports 116a, 126a, and 118a are in fluid communication with slot 122. Ducts 116, 126, and 118 are in respective fluid communication with said ports. Ducts 116, 126, and 118 are cylindrical channels. Duct 126 has a cylindrical axis that corresponds with the cylindrical axis of the sample cylinder 134, and the end cap 110. Duct 126 extends axially from channel 122 to port 126b.

Ducts 118 and 116 are cylindrical and extend from channel 122 at radially opposing angles to ports 118b and 116b respectively.

Figure 5:
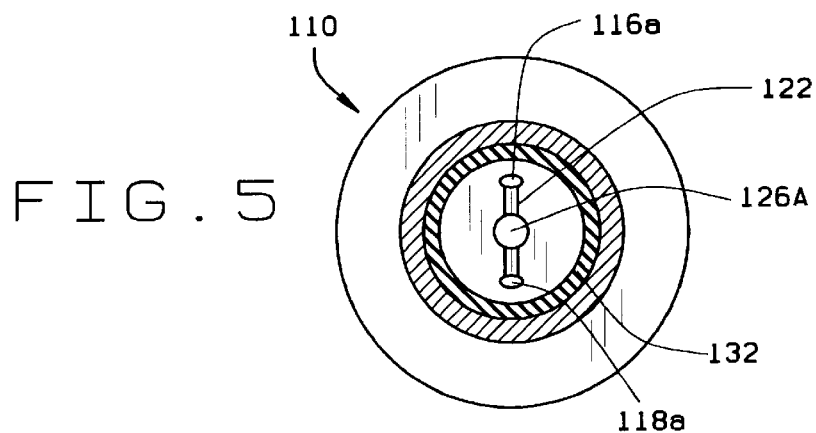
FIG. 5, a cross-sectional top view showing a cross section of the end-cap. View 5—5.

Referring to FIG. 5, view 5—5 of FIG. 4 is shown. Ports 118a, 126a, and 116a are shown. Also, slot opening 122a is shown which extend from port 116a to 114a.

Figure 6:
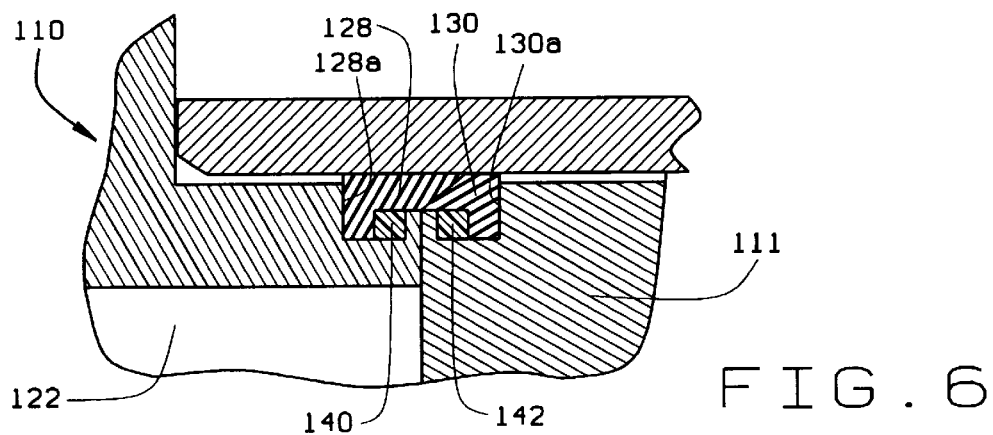
FIG. 6, a detail showing a cross section of the end-cap seal interface.

Referring to FIG. 6, seals 130 and 132 are shown and the piston-end cap, interface. Also shown are ring seal members 140 and 142.

Please note that any of the ports and ducts can be utilized as either inlet or purging paths, which is dependent on the set up.

In view of the foregoing, it is seen that the stated objects of the invention are achieved. The above description explains the principles of the invention and its practical application to thereby enable other skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description shall be interpreted as illustrative rather limiting. Thus, the breadth and scope of the present invention should not be limited by any of the above described exemplary embodiments, but should be defined in accordance with the following claims appended hereto and their equivalents.

The patents referenced herein are incorporated in their entirety for purposes of background information and additional enablement.

What is claimed is:

1. Mating ring seal members axially displaceable with respect to each other comprising:

a protruding beveled opposing tapered edge forming a mitered interface with the adjacent seal; and an inward flange and a ring seal member adjacent said inward flange to control axial positioning thereby forming a gapless seal between coaxial surfaces.

2. Mating ring seal members axially displaceable with respect to each other comprising:

a protruding beveled opposing tapered edge forming a mitered interface with the adjacent seal with the beveled edge located axially offset from the contact plane between the parts being sealed; and an inward flange to control axial positioning thereby forming a gapless seal between coaxial surfaces.

3. The mating ring seal members axially displaceable with respect to each other as recited in claim 2 where one part is stationary and one is movable and the protruding beveled edge is on the stationary part.

4. The mating ring seal members axially displaceable with respect to each other as recited in of claim 3, further comprising:

a ring seal member adjacent said inward flange.

* * * * *